United States Patent [19]
Kinder

[11] 3,960,470
[45] June 1, 1976

[54] HYDRAULIC MOTOR BRAKE

[75] Inventor: Mark Russell Kinder, Lafayette, Ind.

[73] Assignee: TRW Inc., Cleveland, Ohio

[22] Filed: Mar. 17, 1975

[21] Appl. No.: 558,792

[52] U.S. Cl. ............................ 418/61 B; 418/181; 192/3 N; 188/170
[51] Int. Cl.² ..................... F01C 1/02; F03C 3/00; F16D 65/24; F01C 13/00
[58] Field of Search .......... 418/61 B, 181; 192/3 N; 188/170

[56] References Cited
UNITED STATES PATENTS

| | | | |
|---|---|---|---|
| 2,927,669 | 3/1960 | Walerowski | 192/3 N |
| 3,071,210 | 1/1963 | Wrigley et al. | 418/181 |
| 3,208,565 | 9/1965 | Heckt | 192/3 N |
| 3,441,110 | 4/1969 | Ruggen | 188/170 |
| 3,616,882 | 11/1971 | White | 418/61 B |
| 3,688,878 | 9/1972 | Barmasse | 188/170 |
| 3,801,239 | 4/1974 | Larson | 418/61 B |

*Primary Examiner*—John J. Vrablik

[57] ABSTRACT

A brake for a hydraulic device of the type in which a train of driving or driven shafts includes at least one shaft adapted for orbital and rotational motion. One or more frictional braking members are fixedly secured to the rotating and orbiting shaft, and are adapted to be frictionally engaged by a fixed member to apply a braking torque to the shaft. A preferred embodiment discloses a particularly advantageous manner in which such a braking device is applied to a hydraulic motor wherein the orbital and rotational motion of the driven shaft which is braked is provided by a gerotor gearset.

13 Claims, 6 Drawing Figures

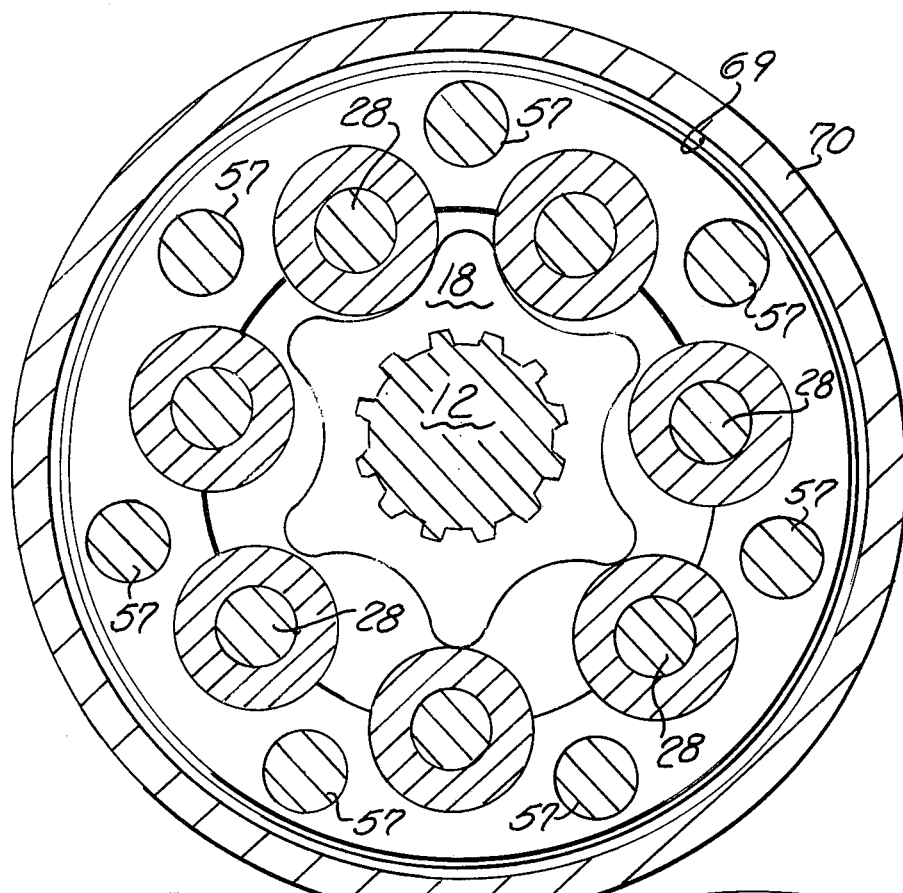
FIG. 3
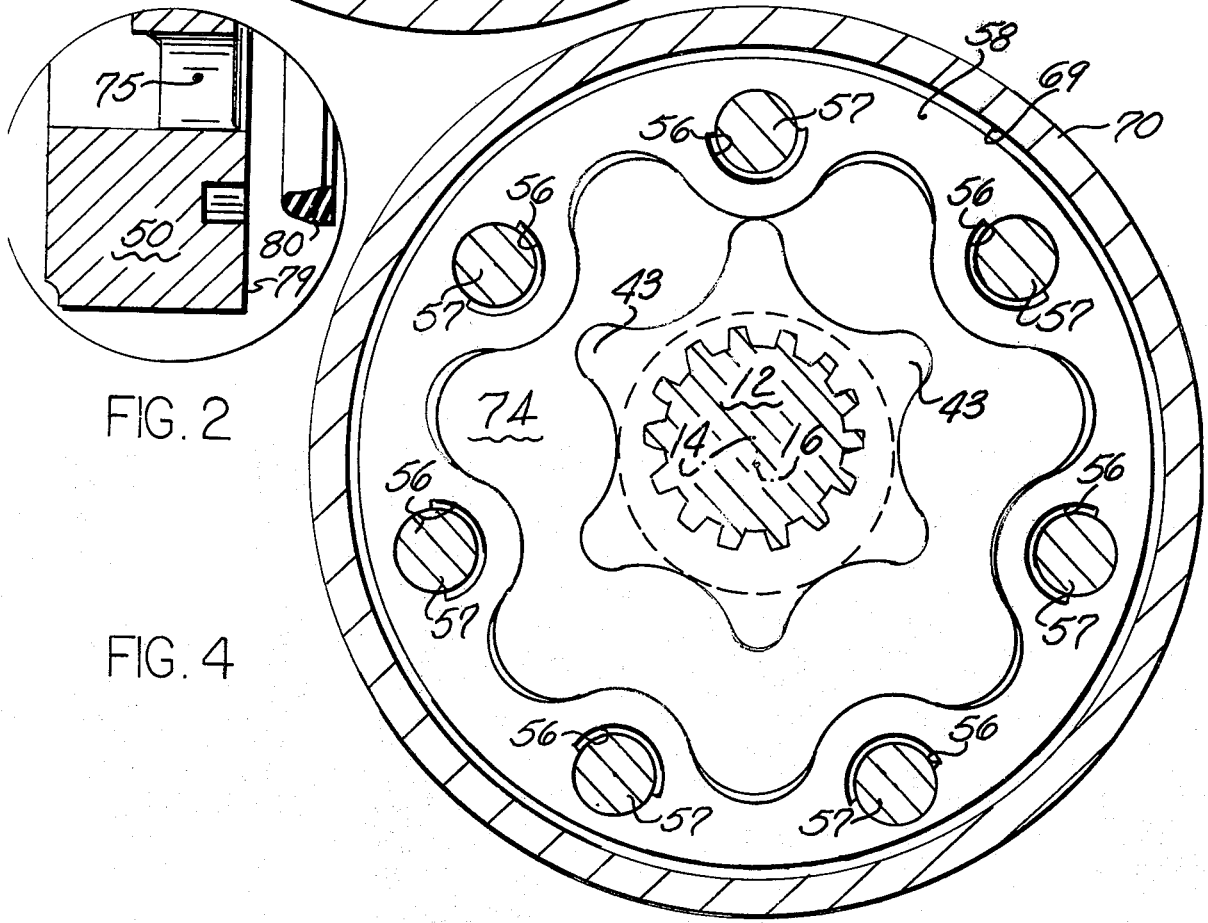
FIG. 2
FIG. 4

HYDRAULIC MOTOR BRAKE

BACKGROUND OF THE INVENTION

This application relates to a brake for a hydraulic device. It is particularly applicable to a hydraulic device of the type in which an eccentrically mounted shaft is adapted for orbital and rotational motion. Even more particularly, the present invention is useful as a motor brake in a hydraulic motor in which the orbital and rotational movement of the shaft is effected by the cooperating action of a gerotor gearset.

Hydraulic motors are designed to use high pressure fluid, to drive a mechanical output shaft. A particularly advantageous form of a hydraulic motor has been found to be one in which a series of expanding and contracting pockets are formed by relative rotational and orbital movement of a pair of gear members conventionally known as a gerotor gearset.

One of the gears of the gearset is generally supported by an eccentrically mounted shaft. In such motors an output shaft coupled to the eccentrically mounted shaft is rotated due to the torque applied to the eccentrically mounted shaft by the high pressure input fluid causing expanding and contracting of the fluid pockets formed by the gerotor gearset. In order to properly time the delivery of high pressure fluid to the pockets, and to convey low pressure fluid from the pockets, there is provided a commutation valve arrangement.

Such types of hydraulic devices require means for applying a braking force to the rotating driven shaft. There has been a need in the art for inexpensive, high torque braking systems which can be applied to hydraulic motors, and which can be actuated automatically when input fluid pressure falls below a predetermined minimum.

BRIEF SUMMARY OF THE INVENTION

The preferred form of the present invention provides a high torque, inexpensive brake which is mounted directly to the driven shaft of a hydraulic motor, and which is designed to automatically apply a high braking torque to that motor when the input fluid pressure falls below a predetermined amount.

The present invention also provides a brake which can be incorporated in any hydraulic device having an eccentrically mounted shaft which is adapted for rotational and orbital motion. One or more frictional braking members are provided and one of each of such braking members is adapted for rotational and orbital movement along with the eccentrically mounted shaft.

When incorporated in a hydraulic motor, means responsive to the fluid pressure in the motor are provided for applying a force to the braking members in a direction which is normal to the frictional surfaces of the members to compress them together and to provide a frictional braking torque to the motor.

The preferred embodiment of this invention relates to a friction brake in a motor of the type where the guiding of the shaft for orbital and rotational movement is provided by a gerotor gearset which forms the expanding and contracting pockets of the motor. However, the present invention is also so designed that the form of the brake itself is perfectly capable of solely guiding the shaft for orbital and rotational motion.

Other objects and advantages of the present invention will become further apparent from the following specification and the accompanying drawings wherein:

DESCRIPTION OF THE DRAWINGS

FIG. 2 is an enlarged sectional view of the area labeled 2—2 in FIG. 1;

FIG. 3 is a sectional view taken approximately along the lines 3—3 of FIG. 1;

FIG. 4 is a sectional view taken approximately along the lines 4—4 of FIG. 1;

DETAILED DESCRIPTION OF AN EMBODIMENT OF THE PRESENT INVENTION

As stated above, the present invention relates to a brake for a hydraulic device of the type in which a driving or driven shaft is adapted for rotational and orbital motion and praticularly to a device in which such motion is effected through the cooperating action of a gerotor gearset. The description which follows describes the present invention and its adaptation to a hydraulic motor. However, the present invention contemplates a wide variety of applications of this braking device using the principals of the present invention and it is anticipated that the manner in which the present invention can be so adapted will become readily apparent to those of ordinary skill in the art from the description which follows.

Figure 1:
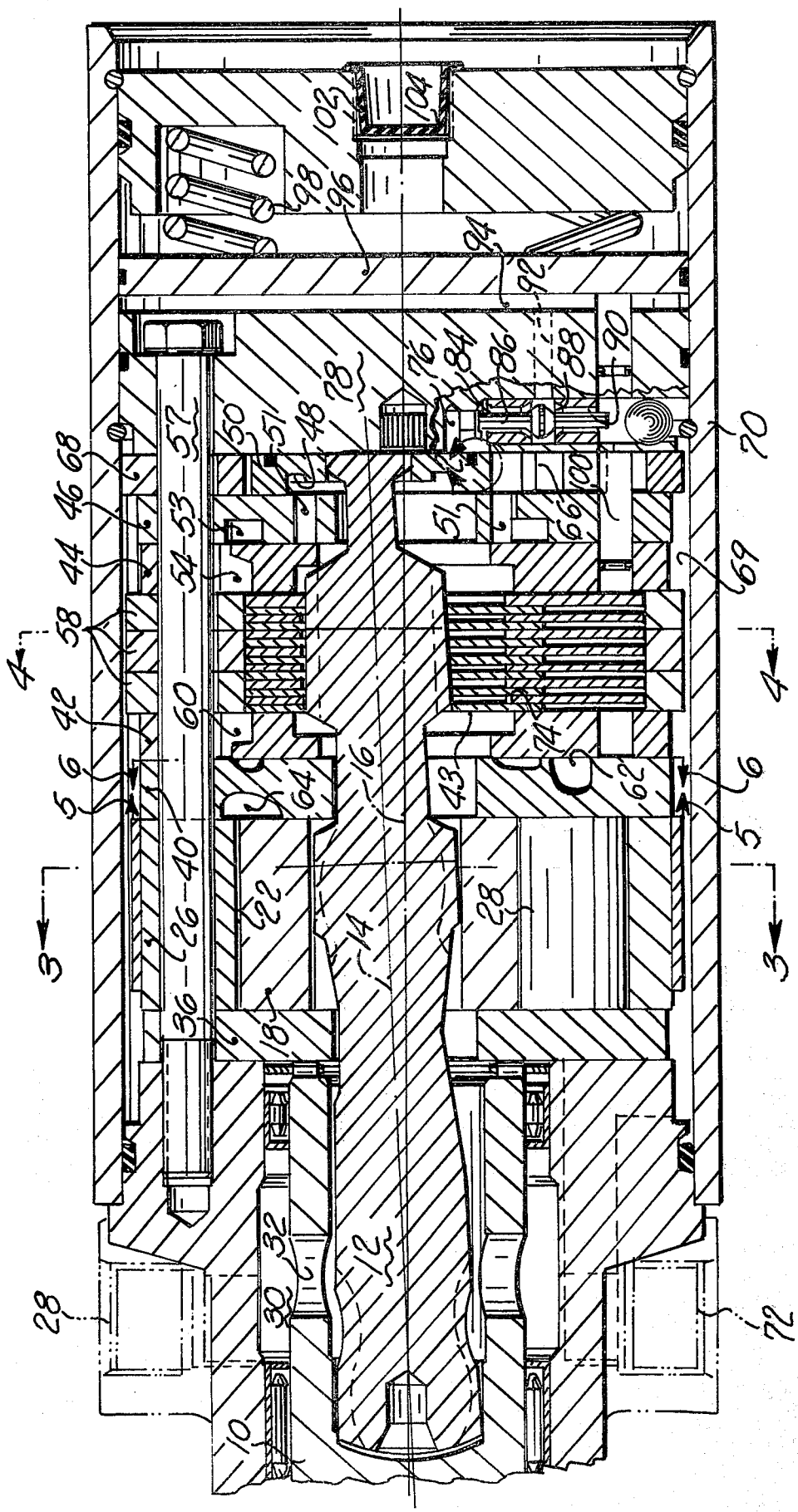
FIG. 1 is a cross-sectional view of a hydraulic motor having a braking device in accordance with the present invention.

Referring to FIG. 1, there is disclosed a hydraulic motor comprising a driving or driven shaft 10 suitably supported for rotation by bearing means which are well known in the art.

The driven shaft 10 has a splined connection to one end of a drive shaft 12 (which shaft is also commonly referred to as a wobble shaft), whose axis of rotation 14 is angularly disposed relative to the axis of rotation 16 of the driven shaft 10.

Drive shaft 12 is connected, via a suitable splined connection, to a rotor 18. Rotor 18 includes a plurality of teeth 20 which are adapted to alternatively expand and contract a series of pockets 22 formed between the teeth 24 of a fixed stator 26. The teeth 24 of the stator preferably take the form of a plurality of roller members 28 rotatably supported in a series of recesses in the fixed stator. The rotor 18 includes one less tooth than the stator, and this form of gearset is conventionally referred to as a gerotor gearset.

Gerotor gearsets ae well known, and reference may be had to U.S. Pat. Nos. 3,452,680 or 3,286,602 for specific details of the operation of such a gearset. For the purposes of the present invention it is sufficient to note that when the device is employed as a motor high pressure fluid delivered to one-half of the pockets applies a driving torque to the gearset, which torque drives the rotor 18, and hence the shaft 12, with orbital and rotational motion relative to axis 14, thereby rotating the driven shaft 10. For maintaining the driving torque on the rotor 18 high pressure fluid is continually delivered to the expanding one-half of the pockets, and lower pressure fluid is delivered from the contracting one-half of the fluid pockets.

The communication of high pressure fluid to and from the pockets of the gerotor gearset is effected through a commutation valve arrangement. Reference is hereby made to aforesaid U.S. Pat. No. 3,452,680 to which many basic aspects of the commutation valve arrangement of the present disclosure are similar. The basic aspect of commutation of fluid in the motor disclosed herein are in accordance with the concepts disclosed in the aforesaid U.S. patent, but are accordingly modified in the manner set forth hereinafter to accomodate the braking device of the present invention in its preferred location.

Referring to FIG. 1, the commutation of high pressure fluid to the expanding pockets of the motor is as follows: The port 28 serves as an inlet port for high pressure fluid. This fluid is directed via passages 30, 32 in the motor housing to the interior of driven shaft 10. The high pressure fluid flows through central bores in wear plate 36 and through the areas between the splines of the drive shaft 12 and the corresponding splines of the rotor 18 (it is contemplated that if the latter flow path is insufficient that a fluid channel can be cut in the drive shaft 12 to bypass the splines). The fluid then flows through central bores in a pair of manifold plates 40, 42 forming a part of the commutation valve arrangement, through the spaces between a plurality of brake discs 43 (whose function will become more apparent from the description which follows), through central bores in manifold plates 44, 46 and into passages 48 formed in a movable commutator valve 50 keyed to the end of the drive shaft 12.

The movable commutator valve 50 directs fluid into one-half of axially extending passages 51 formed in manifold plate 46. There the fluid is directed to the passages through a series of arcuate grooves 53 in a manner similar to that disclosed in the aforesaid U.S. Pat. No. 3,452,680. From the grooves 53 the fluid passes into channels 54 extending axially through the manifold plate 44 and then into the channels 56 formed as enlarged sections around the bolt holes 57 in fixed plates 58. From the channels 54 the fluid passes through channels 60 in fixed manifold plate 42, (these channels are in fact mirror images of the channels 54 formed in the manifold plate 44) and then into channels 59 formed in fixed manifold plate 40.

Figure 5:
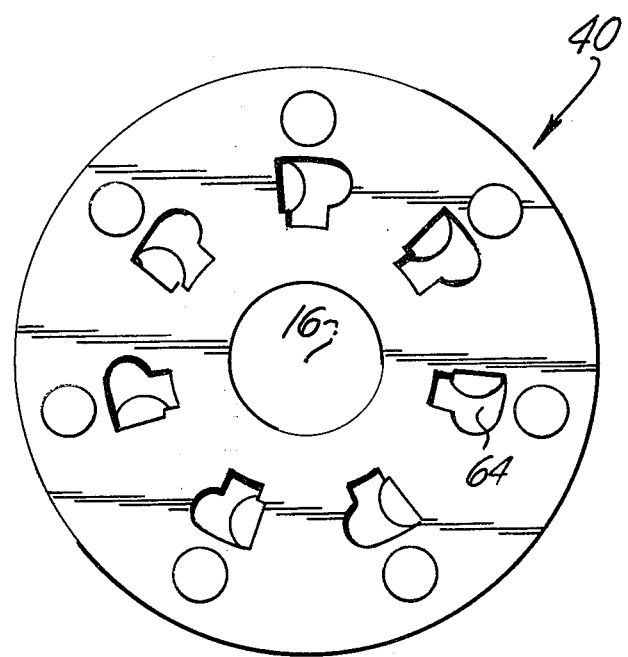
FIGS. 5 and 6 are sectional views, respectively, with parts omitted, of a manifold plate viewed from the directions shown by lines 5—5 and 6—6 of FIG. 1.
Figure 6:
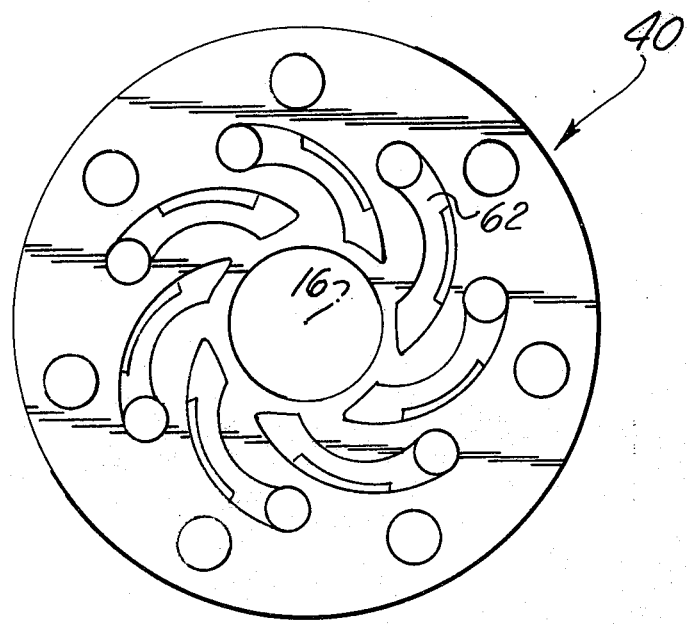

The shape of the manifold plate 40 may be appreciated by reference to FIGS. 5 and 6. Arcuate passages 62 are formed in one face of the manifold plate 40, and radially oriented passages 64 are formed in the other face of the manifold plate 40 and suitable fluid passages between these channels provide for commutation of fluid both to and from the expanding and contrcting pockets of the gerotor gearset.

The aforesaid commutation valving arrangement directs high pressure fluid into one-half of the pockets and simultaneously takes low pressure fluid from the contracting one-half of the pockets and directs it by similar commutation means to manifold plate 46 where the axially extending passages 51 direct the low pressure fluid into the area 66 between the movable commutator valve member 50 and fixed plate 68 which surrounds it. This low pressure fluid is directed via suitable channels (not shown but well known, as may be seen by reference to the aforesaid U.S. Pat No. 3,452,680) to a fluid conduit 69 formed about the exterior of the fixed plates and the outer casing 70 of the motor and thereby serves to direct the low presssure fluid out the exit port 72.

The braking device is shown in FIGS. 1 and 4. The stationary plates 58 have a toothed-shaped inner periphery generally similar to that of the stator of a gerotor gearset. Splined to the drive shaft 12 are a plurality of plate members 43, each of which has an outer periphery in the shape of a toothed gear in the general shape and orientation of a rotor member of a gerotor gearset. The drive shaft 12 carries a plurality of spaced plate members 43 and between those plate members there is provided a plurality of loose plate members 74. Each of the plate members has an outer periphery generally corresponding to the toothed inner periphery of the stationary plate members 58, and an inner periphery which is circular shaped to allows the drive shaft 12 to freely move therewithin.

In the disclosed embodiment the bearing support which promotes the rotational and orbital motion of drive shaft 12 is provided by the gerotor gearset members 18, 26. On the other hand, the shapes of plates 58 and 43 which also forms a gerotor gearset is also capable of providing similar bearing support for the drive shaft 12. Also, where, as in the preferred embodiment, the braking members do not supply such bearing support, the disclosed toothed shapes of plates 58, 43 and 74 are not essential, but may take other suitable shapes.

Referring to FIGS. 1 and 2, the movable commutator valve 50 includes a plurality of fluid passages 75 which communicate the interior of that valve with one or more axially directed passages 76 in a fixed plate member 78. The outer surface 79 of the commutator valve 50 includes a sealing ring 80, and serves to seal the interface between the plate member 78 and the valve surface 79 against fluid leakage therethrough. Thus, since the interior of the movable commutator 50 is receiving high pressure input fluid, the fluid passage serves to communicate high pressure fluid to the axially extending passages 76 in the plate member 78.

The axially extending passages 76 communicate with second fluid passages 84 each of which includes a valve member 86 slidably received therein. High pressure fluid directed into a fluid passage 84 serves to bias the valve member 86 against appropriate lands 88 block fluid flow into passage 90 (which opens to low pressure return passage). However, the high pressure fluid is free to flow through second axially extending passages 92 in the plate member 78. Such fluid is thereby directed to a space 94 between the fixed plate member 78 and a movable brake actuating plate member 96.

Movable brake actuator plate 96 is biased toward the fixed plate member 78 by means of springs 98. Therefore, high pressure fluid entering the motor and directed into the space 94 serves to urge the brake actuator plate 96 away from plate member 78 against the bias of spring 98.

Co-operating with the brake actuator plate 96 are a plurality of axially extending pins 100. The pins 100 extend through appropriate bores in the various fixed plate members and their end faces extend in a direction generally normal to the braking plate members 43 and 74. The length of these pin members 100 is such that when the brake actuator plate 96 is moved under its spring bias into a predetermined position relative to the plate member 78 the pin members 100 are effective to compress the brake plates 74 and plates 43 against one another and against the fixed valve member. This gives rise to a frictional contact between the braking plates for applying a braking torque to the drive shaft 12.

Of course, the force applied by the pins 100 to the fixed plate is also transmitted through the various fixed plates so that the wear plate 36 effectively applies a frictional braking torque directly to driven shaft 10. The effective braking action on the shaft 10 therefor amounts to the combination of the braking torque applied to the shaft 10 itself as well as the braking torque applied to the drive shaft 12 by the braking plates 43.

The manner in which this braking torque significantly contributes to the braking of driven shaft 10 may be appreciated by the following formula:

{6 (orbits) × normal force (braking spring) × coefficient of friction × eccentricity (effect of orbit momentum) × friction surfaces} + normal braking for rotation {friction radius × normal force × coefficient of friction × friction surfaces}

In the foregoing formula the first term represents the braking torque due to the co-operating action of the braking plates 43 and 74, and the second term represents the normal braking torque for a rotating shaft.

Thus, the braking plates and the torque which they produce provides a substantial braking torque in addition to the normal braking force applied directly to the driven shaft 10. This braking torque can be varied by varying the size or shape of the friction surfaces. This is particularly adaptable to the situation where as in the preferred embodiment, the braking plates do not provide the bearing support for the shaft 12. As in the preferred embodiment where the plates also form part of the fluid passages the size and shapes of the plates is also subject to the fluid flow characteristics.

It is further noted that the present invention further discloses a particularly effective location for the braking plates 43. Specifically, they are located inward of the rotatable commutator valve member 50 and the manifold plates 44, 46. Since the braking torque involves forces which are normal to and eccentrically mounted shaft member 12 there exists the possibility that such normal forces can create a moment tending to cause "cocking" of the drive shaft 12. "Cocking" is a highly undesirable characteristic of such a motor. However, it has been found that by locating the braking plates 43 inward of both the movable commutator valve 50 and the manifold plates 44, 46 the moment arm is low due to the small eccentricity of the drive shaft at this point. Therefore, any tendency of the system toward "cocking" is within tolerable limits, and any potential detrimental effects are markedly outweighed by the advantages which these braking plates 43 provide to such a motor.

An additional advantage of the present invention is that by the disclosed form of the braking plates they are perfectly capable of providing the sole bearing and guiding support for adapting the drive shaft 12 for orbital and rotational movement. While the preferred embodiment disclosed herein relates to a motor which employs a gerotor gearset, the present invention is perfectly adaptable to other forms of hydraulic devices involving a driven shaft adapted for orbital and rotational movement.

Referring again to FIG. 1, an additional feature of the present invention will be readily apparent. End port 102 communicates with the interior of the fluid motor and particularly with the portion of the motor externally of the brake actuator plate member 96. By this port, which is closed by a plug 104, the motor interior can be drained of leaked fluid, or a positive source of fluid may be applied to plate member 96 in order to positively actuate the brake actuator member 96.

With the above disclosure in mind, numerous other advantages and modifications of the present invention will become readily apparent to those of ordinary skill in the art.

Therefore, having disclosed the preferred embodiment of this invention, what is claimed is:

1. A hydraulic device comprising a first shaft rotatable about its longitudinal axis, a second shaft rotatable about its longitudinal axis, means for joining said second shaft to said first shaft for rotation therewith, said second shaft being oriented with its longitudinal axis angularly disposed relative to the longitudinal axis of said first shaft, so that said first and second shafts are adapted for joint rotation and said second shaft is adapted for both orbital and rotational motion, a hydraulic motor for rotating said shafts, means for applying a braking torque to said first and second shafts tending to retard motion of said first and second shafts, said braking means being separate from said hydraulic motor comprising one or more braking members fixedly secured to said second shaft for rotational and orbital motion therewith and means for frictionally resisting the orbital and rotational movement of said braking members.

2. A hydraulic device as set forth in claim 1 wherein said hydraulic device includes a fixed plate member having a surface and each braking member includes a braking surface, and said braking means further including means for applying a frictional braking force between each braking member and the surface of said fixed member.

3. A hydraulic device as set forth in claim 2 wherein said braking members comprise a plurality of first spaced plate members, and said braking means further includes second plate members interspersed between said first first plate members, said second plate members each having a pair of braking surfaces, and means for applying to said braking means a force having components normal to said braking surfaces to compress said braking surfaces against one another with at least one braking surface being compressed against said fixed surface so that said braking surfaces are urged into frictional engagement with one another to frictionally resist motion of said first braking members.

4. A hydraulic device as set forth in claim 3 and further comprising actuator means for applying said force when the fluid pressure in said device falls below a predetermined level.

5. A hydraulic device as set forth in claim 4 wherein said actuator means comprises an actuator member which is spring biased toward a first position in which it applys said force to said braking means, and means for applying high pressure fluid entering said motor against said actuator member in a direction tending to urge said actuator member away from said first position, whereby as long as said high pressure fluid is above a predetermined minimum said actuator member will be held away from said first position.

6. A hydraulic device as set forth in claim 1 wherein said hydraulic motor comprises a toothed rotor fixedly mounted on said second shaft, said device further comprising a fixed stator having one more tooth than said rotor with the teeth of said rotor and stator aligned for intermeshing with each other thereby mounting said second shaft for orbital and rotational motion.

7. A hydraulic device as set forth in claim 6 wherein said rotor comprises a toothed outer periphery on each of said braking members.

8. A hydraulic device as set forth in claim 6 wherein said rotor and stator are axially spaced from said braking members.

9. A hydraulic device as set forth in claim 8 wherein said rotor and stator combine to form alternately expanding and contracting fluid pockets.

10. In a hydraulic motor of the type having a pair of engaged rotatable driven shafts, a first one of said driven shafts being mounted with its axis of rotation inclined relative to the axis of a second of said driven shafts, a gerotor gearset associated with said first driven shaft and cooperating to form alternately expanding and contracting pockets for applying a driving torque to said first driven shaft, which driving torque tends to drive said first driven shaft with orbital and rotational motion, the improvement comprising braking means for applying a frictional braking torque to said first driven shaft, said braking means including one or more braking members fixedly secured to said first driven shaft so that braking of said one or more braking members results in braking of said shaft, and means for braking said one or more braking members.

11. In a hydraulic motor of the type set forth by claim 10, the further improvement comprising means for actuating said braking means when the motor's input fluid falls below a predetermined minimum pressure.

12. In a hydraulic motor as set forth in claim 10 said hydraulic motor having commutation valve means for directing fluid to and from the expanding and contracting pockets of said gerotor gearset, and said commutation valve means including a movable commutator valve member axially spaced from said gearset, the further improvement comprising means for fixedly mounting said braking members to said first driven shaft at an axial location between said movable commutator valve and said gearset.

13. In a hydraulic motor as defined in claim 10, which comprises a plurality of braking members in the form of a first plurality of friction discs fixedly secured to said shaft, and said means for braking said friction discs comprises a second plurality of friction discs interposed between said first plurality, and means for forcing said discs into frictional braking contact.

* * * * *